(12) United States Patent
Moore

(10) Patent No.: US 7,983,898 B2
(45) Date of Patent: Jul. 19, 2011

(54) GENERATING A PHRASE TRANSLATION MODEL BY ITERATIVELY ESTIMATING PHRASE TRANSLATION PROBABILITIES

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/811,114

(22) Filed: Jun. 8, 2007

(65) Prior Publication Data

US 2008/0306725 A1    Dec. 11, 2008

(51) Int. Cl.
*G06F 17/28* (2006.01)
(52) U.S. Cl. .................. 704/2; 704/277; 704/5
(58) Field of Classification Search .......... 704/1–10, 704/277, 257, 251, 240
See application file for complete search history.

(56) References Cited

U.S. PATENT DOCUMENTS

| | | | |
|---|---|---|---|
| 5,805,832 A | 9/1998 | Brown | 711/1 |
| 6,304,841 B1 | 10/2001 | Berger | 704/2 |
| 6,885,985 B2 | 4/2005 | Hull | 704/2 |
| 6,990,439 B2 | 1/2006 | Xun | 704/2 |
| 7,054,803 B2* | 5/2006 | Eisele | 704/2 |
| 7,200,550 B2 | 4/2007 | Menezes | 704/10 |
| 7,206,736 B2* | 4/2007 | Moore | 704/2 |
| 2004/0030551 A1 | 2/2004 | Marcu | 704/240 |
| 2005/0038643 A1 | 2/2005 | Koehn | 704/2 |
| 2006/0015318 A1 | 1/2006 | Moore | |
| 2006/0015320 A1 | 1/2006 | Och | 704/2 |
| 2007/0016397 A1 | 1/2007 | Lu | 704/2 |

OTHER PUBLICATIONS

David Chiang, "A Hierarchical Phrase-Based Model for Statistical Machine Translation" Proceedings of the 43$^{rd}$ Annual Meeting of the ACL, pp. 263-270 Ann Arbor, Jun. 2005.
PCT International Search Report Application No. PCT/US2008/063403.
Luke S. Zettlermoyer et al., "Selective Phrase Pair Extraction for Improved Statistical Machine Translation" Proceedings of NAACL HTL 2007, Apr. 26, 2007. See Abstract, section 1-2.
Ashish Venugopal et al. "Effective Phrase Translation Extraction from Alignment Models" Proceedings of the 41$^{st}$ Annual Meeting of the Association for Computational Linguistics, Jul. 7, 2005. See abstract, section 2-4.
Robert C. Moore et al., "An Iteratively-Trained Segmentation-Free Translation Model for Statistical Machine Translation" In Proceedings of the Second Workshop on Statistical Machine Translation, Jun. 23, 2007. See Abstract, section 2-5.
Stephan Vogel, et al. "The CMU Statistical Machine Translation System", Language Technologies Institute, Carnegie Mellon University, 8 pages, 2003.
Richard Zens, et al., "Phrase-Based Statistical Machine Translation" Human Language Technology and Pattern Recognition, Germany 15 pages, 2002.

* cited by examiner

*Primary Examiner* — Huyen X. Vo
(74) *Attorney, Agent, or Firm* — Joseph R. Kelly; Westman, Champlin & Kelly, P.A.

(57) ABSTRACT

A phrase translation model is trained without assuming a segmentation of training data into non-overlapping phrase pairs. Instead, the training algorithm assumes that any particular phrase instance has only a single phrase instance in another language as its translation in that instance, but that phrases can overlap. The model is trained by computing expected phrase alignment counts, deriving selection probabilities from current estimates of translation probabilities and then re-estimating phrase translation probabilities according to the expected phrase alignment counts computed. The model is trained by iterating over these steps until one or more desired stopping criteria are reached. The trained model can be deployed in a machine translation system.

18 Claims, 8 Drawing Sheets je ne parle pas Français   200
i don't speak French nous acceptons votre opinion   202
we accept your view monsieur le Orateur , je invoque le Règlement   204
Mr. Speaker , I rise on a point of order

FIG. 3A

GENERATING A PHRASE TRANSLATION MODEL BY ITERATIVELY ESTIMATING PHRASE TRANSLATION PROBABILITIES

BACKGROUND

Machine translation is a process by which a textual input in a first language (a source language) is automatically translated into a textual output in a second language (a target language). Some machine translation systems attempt to translate a textual inputs word for word, by translating individual words in the source language into individual words in the target language. However, this has led to translations that are not very fluent.

Therefore, some systems currently translate based on phrases. Machine translation systems that translate sequences of words in the source text, as a whole, into sequences of words in the target language, as a whole, are referred to as phrase based translation systems.

During training, these systems receive a word-aligned bilingual corpus of sentence translation pairs, where words in a source training text are aligned with corresponding words in a target training text. Based on the word-aligned bilingual corpus, phrase pairs are extracted that are likely translations of one another. By way of example, using English as the source text and French as the target text, phrase based translation systems find a sequence of words in English for which a sequence of words in French is a translation of that English word sequence.

Phrase translation tables are important to these types of phrase-based statistical machine translation systems. The phrase translation tables provide pairs of phrases that are used to construct a large set of potential translations for each input sentence, along with feature values associated with each phrase pair. The feature values can include estimated probabilities that one of the phrases in the phrase pair will translate as the other on a particular occasion. These estimates are used to select a best translation from a given set of potential translations.

For purposes of the present discussion, a "phrase" can be a single word or any contiguous sequence of words or other tokens, such as punctuation symbols, that are treated as words by the translation system. It need not correspond to a complete linguistic constituent.

There are a variety of ways of building phrase translation tables. One current system for building phrase translation tables selects, from a word alignment provided for a parallel bilingual training corpus, all pairs of phrases (up to a given length) that meet two criteria. A selected phrase pair must contain at least one pair of words linked by the word alignment and must not contain any words that have word-alignment links to words outside the phrase pair. That is, the word-alignment links must not cross phrase pair boundaries.

Conditional phrase translation probabilities for the phrase pairs have, in the past, been estimated simply by marginalizing the counts of phrase instances as follows:

$$p(x|y) = \frac{C(x, y)}{\sum_{x'} C(x', y)} \quad \text{Eq. 1}$$

In Eq. 1, p(x|y) is the probability of a phrase y in a source language being translated as a phrase y in a target language; C(x,y) is the count of the number instances of target phrase x being paired with source phrase y in the phrase pair instances extracted from the word aligned corpus, and x' varies over all target phrases that were ever seen in the extracted phrase pairs, paired with source phrase y.

Phrase translation probabilities according to Eq. 1 are thus estimated based on how often the phrases in a particular pair are identified as translations of each other, compared to how often the phrases in question are identified as translations of other phrases.

This method can be used to estimate the conditional probabilities of both target phrases given source phrases and source phrases given target phrases, by reversing the roles of source phrases and target phrases in Eq. 1.

There are a number of problems associated with this system for estimating phrase translation probabilities. A first is that it counts the same instances of a word sequence multiple times if it participates in multiple possible phrase pairs, and gives all possible phrase pair instances equal weight, no matter how many other possible phrase pair instances there are for the word sequence instances involved. Thus, the more ambiguity there is about how a particular word sequence instance aligns, the more overall weight that instance receives.

A second problem is that the method fails to take into account instances of a word sequence that cannot be part of any phrase pair, because of constraints from word alignment links, in estimating the translation probabilities for that word sequence. Thus, if a word sequence "a" has 999 instances in which it cannot be aligned to any phrase because of these constraints, and one instance in which it can be aligned only to word sequence "b", then p(b|a) will be estimated to be 1.0, instead of 0.001, which might seem more plausible.

An example may be helpful. Assume that a French target phrase almost always aligns to a source English phrase "object linking and embedding". Given the rules of French grammar, the French phrase would likely have the word-for-word translation "linking and embedding of objects." Note that within this French phrase, there is no contiguous sequence of words that corresponds to "object linking." Now suppose that the system attempted to estimate the translation probability for the source, (English) language phrase "object linking" and found one French instance of a phrase that translated word-for-word as "linking of objects". Assume further that there existed 999 instances of the French phrase corresponding to "object linking and embedding". However, the 999 instances of the latter translation would not be even identified as containing possible translations of "object linking" because the word alignments would create a crossing pattern in which word alignment links crossed phrase boundaries. Therefore, the system would only notice the one instance of "object linking" translated into the French instance of "linking of objects" and would not take into account the 999 other instances of "object linking" that occurred, but did not translate to any French phrase. The system would thus calculate the probability of the source language phrase "object linking" being translated to the French translation of "linking of objects" as 1.0, when in fact it should probably be closer to 0.001.

In addition, this method of estimating phrase translation probabilities for the phrase table does not use information from instances in which word-alignment constraints make the alignment of a word sequence more certain, in order to help decide how to align other instances of the word sequence in the absence of word alignment constraints.

In order to address some of these difficulties, some prior approaches have attempted to estimate phrase translation probabilities directly, using generative models trained on a parallel corpus by the expectation maximization (EM) algorithm. Such models assume that a source sentence "a" is segmented into some number of phrases, and for each phrase selected in "a", a phrase position is selected in the target sentence "b" that is being generated. For each selected phrase in "a" and the corresponding phrase position in "b", a target phrase is chosen, and the target sentence is read off from the sequence of target phrases.

This prior method thus assumes that the parallel corpus has a hidden segmentation into non-overlapping phrases, so that no particular word instance participates in more than one phrase instance. These types of systems have performed relatively poorly, and it is believed that the poor translation quality generated by these types of models results from the assumption that the training text has a unique segmentation into non-overlapping phrases.

The parameters for these models are estimated using the EM algorithm. The E step deals with the problem of counting the same instance of a word sequence multiple times by normalizing fractional counts so that the more ambiguity there is, the lower the resulting fractional counts. It also deals with the issue of using information from instances in which word-alignment constraints make the alignment of a word sequence more certain by weighting the fractional counts by their probability as estimated by the preceding M step.

However, prior art models following this approach have assumed a uniform probability distribution over all possible segmentations and therefore fail to take into account instances of a word sequence that cannot be part of any phrase pair, because of constraints from word alignment links. Therefore, given the freedom to select whatever segmentation maximizes the likelihood of any given sentence pair, the EM algorithm tends to favor segmentations that yield source phrases with as few occurrences as possible, since more of the associated conditional probability mass can be concentrated on the target phrase alignments that are possible in the sentence being analyzed.

Applied to a model of this type, the EM algorithm therefore tends to maximize the probability of the training data by concentrating probability mass on the rarest source phrase it can construct to cover the training data. The resulting probability estimates thus have less generalizability to unseen data than if probability mass were concentrated on more frequently occurring source phrases.

The discussion above is merely provided for general background information and is not intended to be used as an aid in determining the scope of the claimed subject matter.

SUMMARY

A phrase translation model is trained without assuming a segmentation of training data into non-overlapping phrase pairs. Instead, the training algorithm assumes that any particular phrase instance has only a single phrase instance in another language as its translation in that instance, but that phrases can overlap.

The training algorithm estimates phrase translation probabilities according to the model by computing expected phrase alignment counts, deriving selection probabilities from previous estimates of phrase translation probabilities, and then re-estimating phrase translation probabilities according to the expected phrase alignment counts computed. These steps are iterated over until one or more desired stopping criteria are reached. The estimated phrase translation probabilities can be deployed in a machine translation system.

BRIEF DESCRIPTION OF THE DRAWINGS

FIG. 3A shows one example of a word-aligned corpus.

DETAILED DESCRIPTION

Figure 1:
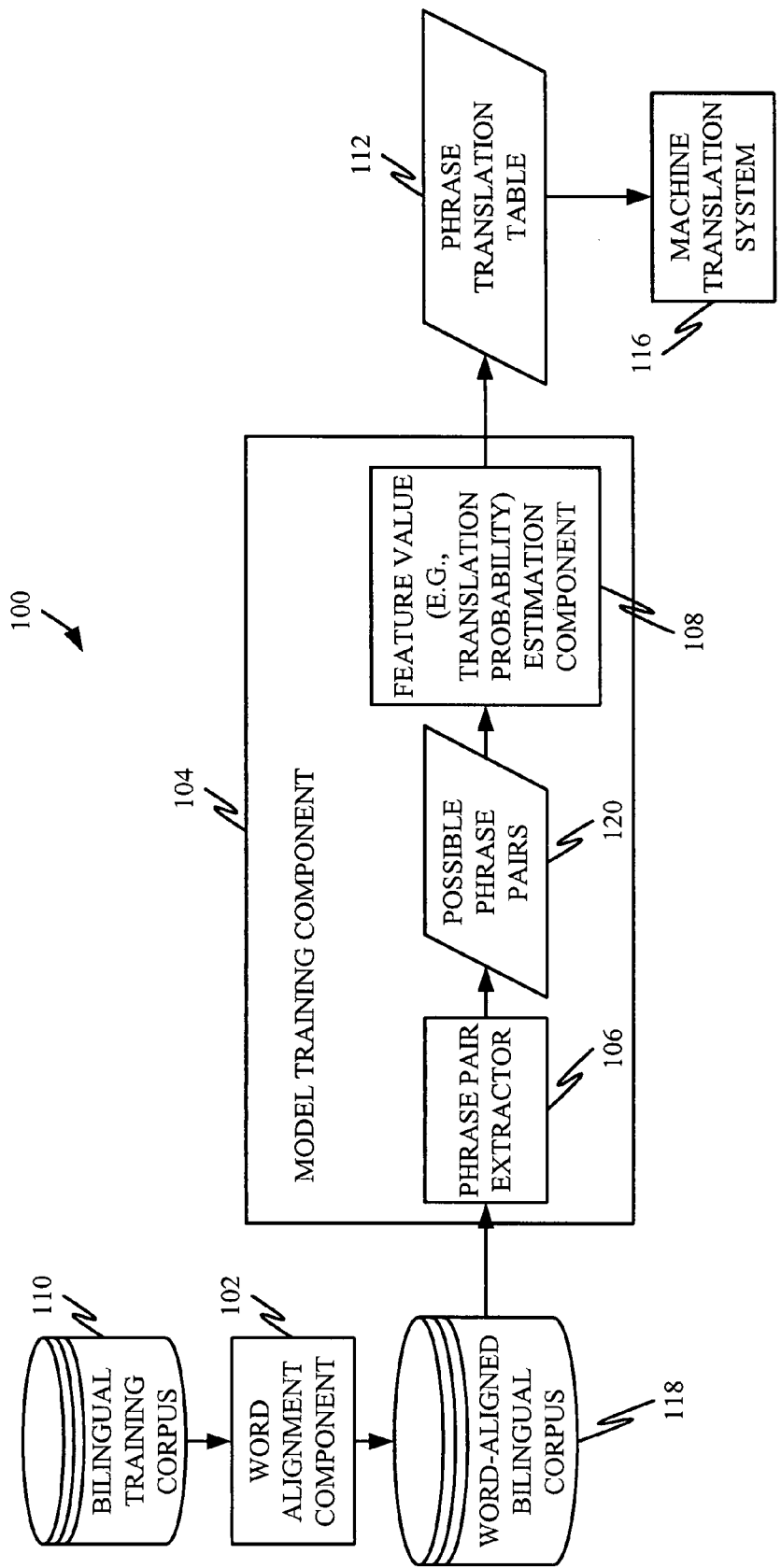
FIG. 1 is a block diagram of one machine translation training system.

FIG. 1 is a block diagram of a machine translation training system 100 in accordance with one embodiment. System 100 includes word alignment component 102, and model training component 104. Model training component 104 illustratively includes phrase pair extractor 106 and feature value estimation component 108. FIG. 1 also shows that system 100 has access to bilingual corpus 110. In one embodiment, bilingual corpus 110 includes sentence translation pairs. The sentence translation pairs are pairs of sentences, each pair of sentences having one sentence that is in the source language and a translation of that sentence that is in the target language.

Model training component 104 illustratively generates a phrase translation table 112 for use in a statistical machine translation system 116.

Figure 2:
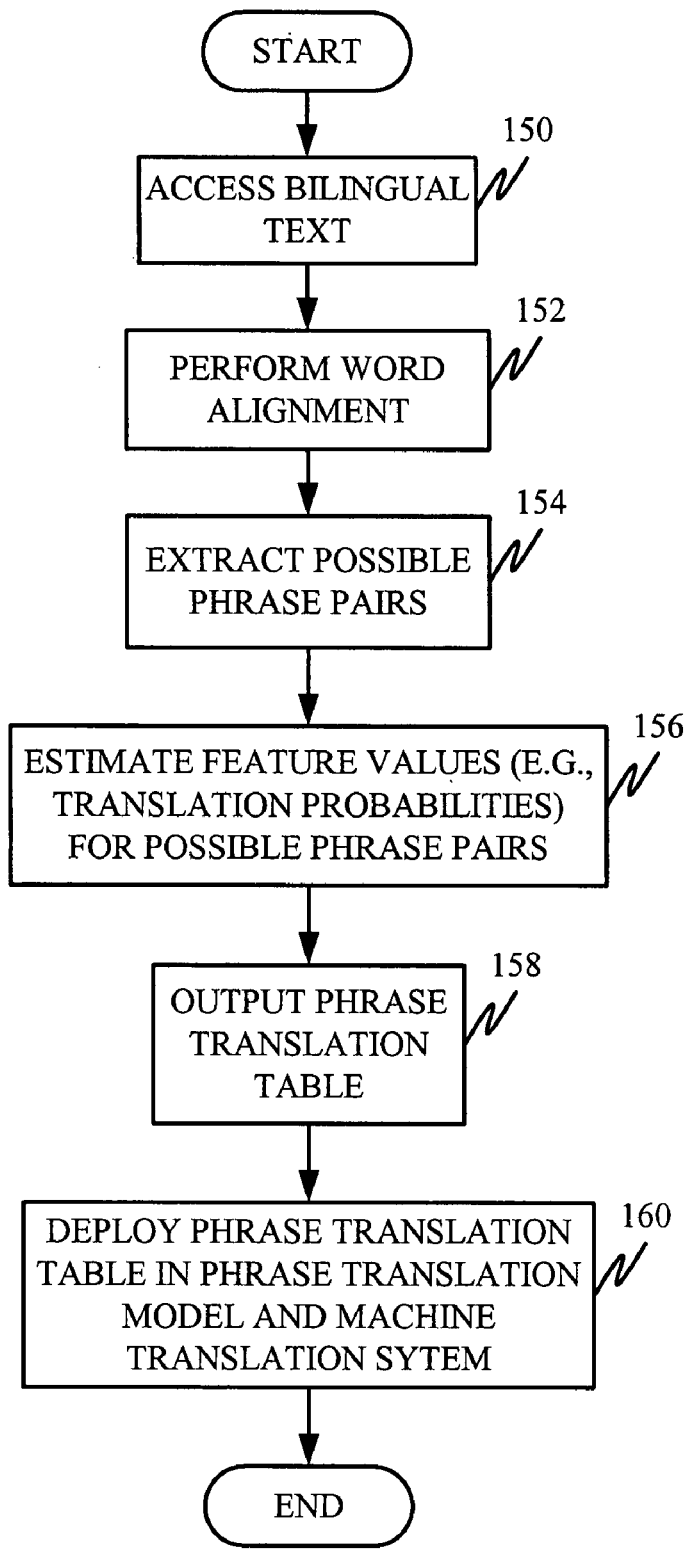
FIG. 2 is a flow diagram illustrating the overall operation of the system shown in FIG. 1.

FIG. 2 is a block diagram illustrating the overall operation of one embodiment of system 100, shown in FIG. 1. Word alignment component 102 first accesses the sentence pairs in bilingual training corpus 110 and computes a word alignment for each sentence pair in the training corpus 110. Accessing the bilingual corpus 110 is indicated by block 150 in FIG. 2, and performing word alignment is indicated by block 152. The word alignment is a relation between the words in the two sentences in a sentence pair. In one illustrative embodiment, word alignment component 102 is a discriminatively trained word alignment component that generates word aligned bilingual corpus 118. Of course, any other word alignment component 102 can be used as well.

FIG. 3A illustrates three different sentence pairs 200, 202 and 204. In the examples shown, the sentence pairs include one French sentence and one English sentence, and the lines between the words in the French and English sentences represent the word alignments calculated by word alignment component 102.

Once a word-aligned, bilingual corpus of sentence translation pairs 118 is generated, model training component 104 generates the phrase translation table 112 for use in statistical phrase translation system 116. First, phrase pair extractor 106 in model training component 104 extracts possible phrase pairs from the word-aligned bilingual corpus 118 for inclusion in the phrase translation table 112. Extracting the possible phrase pairs is indicated by block 154 in FIG. 2.

In one embodiment, every phrase pair is extracted, up to a given phrase length, that is consistent with the word alignment that is annotated in corpus 118. In one embodiment, each consistent phrase pair has at least one word alignment between words within the phrases, and no words in either phrase (source or target) are aligned with any words outside of the phrases.

Figure 3B:
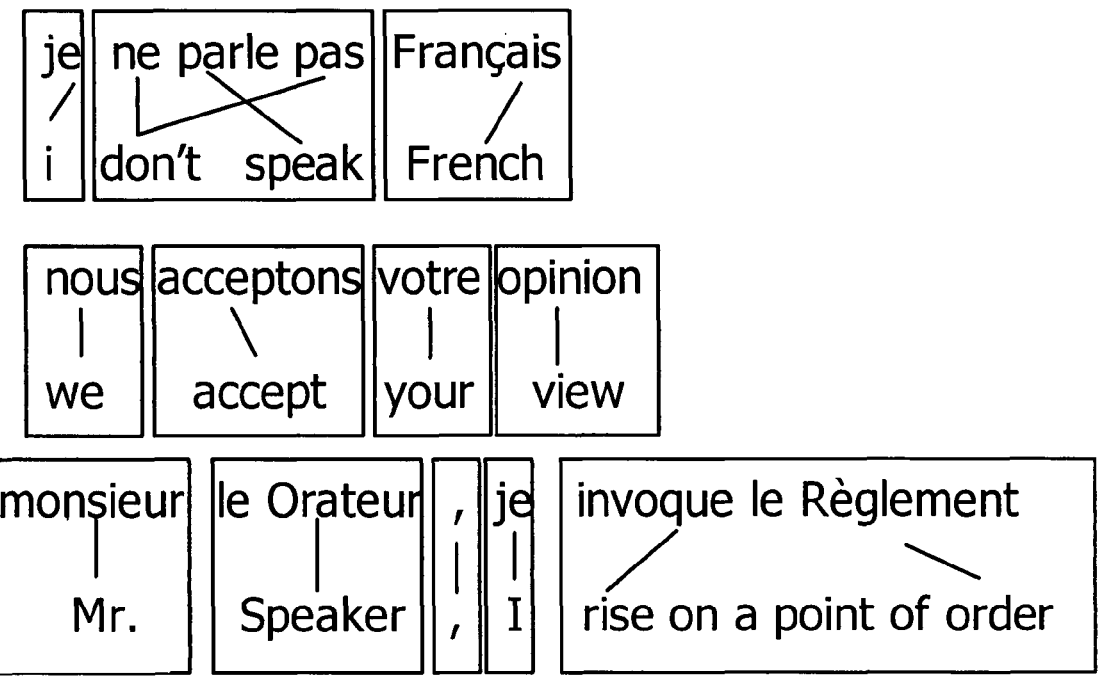
FIG. 3B shows one example of extracted phrase pairs.

FIG. 3B shows some of the phrases that are extracted for the word aligned sentence pairs shown in FIG. 3A. The phrases in FIG. 3B are exemplary only. The possible phrase pairs are illustrated by block 120 in FIG. 1.

For each extracted phrase pair (s,t) (where s is the source portion of the phrase pair and t is the target portion of the phrase pair) feature value estimation component 108 calculates estimated values of features associated with the phrase pairs. In the embodiment described herein, the estimated values associated with the phrase pairs are translation probabilities that indicate the probability of the source portion of the phrase pair being translated as the target phrase pair, and vise versa. Estimating the phrase translation probabilities for the possible phrase pairs 120 is indicated by block 156 in FIG. 2.

Model training component 104 then outputs phrase translation table 112 which includes phrase pairs along with translation probabilities. This is indicated by block 158 in FIG. 2.

The phrase translation table can then be incorporated into a statistical machine translation system 116, in which it is used to provide one or more target phrases that are likely translations of source phrases that match segments of a source text to be translated. The probabilities, according to the phrase translation table, of source phrases translating as particular target phrases, and of target phrases translating as particular source phrases, are used to predict the most likely target language translation of the source language text, which is then output by the machine translation system. How this is done is well known to practitioners skilled in the art of statistical machine translation. Deployment of the phrase table 112 in system 116 is indicated by block 160 in FIG. 2.

Figure 4:
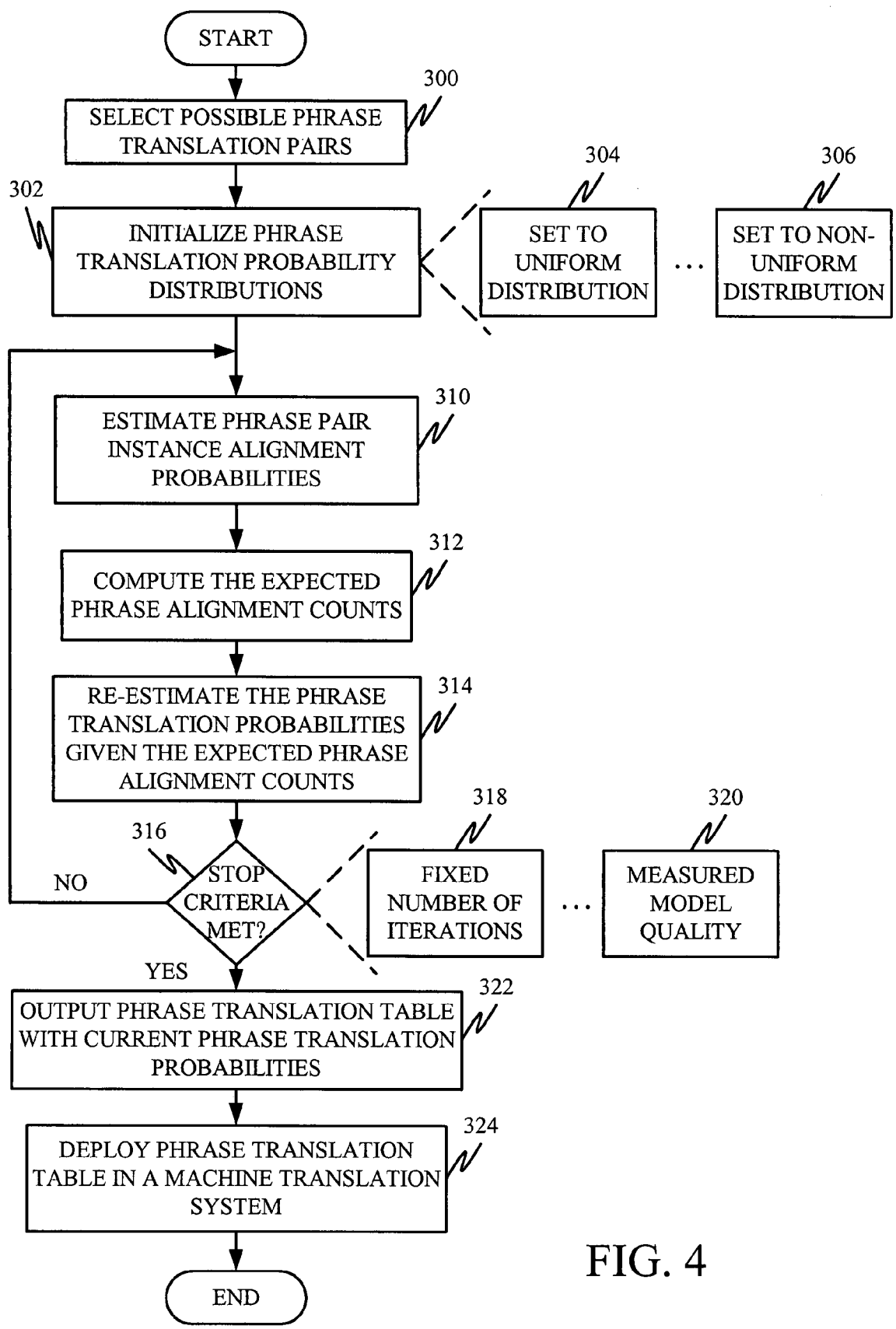
FIG. 4 is a flow diagram illustrating one embodiment of the operation of a model training component shown in FIG. 1.

Model training component 104 uses an iterative training procedure, similar to the Expectation Maximization (EM) algorithm, in order to estimate the phrase translation probabilities. FIG. 4 is a flow diagram illustrating this in greater detail.

Model training component 104 first selects possible phrase translation pairs 120. This is indicated by block 300 in FIG. 4. Feature value estimation component 108 then initializes the translation probability distributions for each of the possible source and target phrases. This is indicated by block 302 in FIG. 4.

Steps 300 and 302 can be performed in a number of different ways. For instance, component 108 can initialize the translation probability distributions with uniform phrase translation probabilities. In other words, each possible translation for a given phrase can be initially set to have the same probability. Of course, the initial phrase translation probability distributions can be set in a non-uniform way as well. For instance, word alignment component 102 illustratively uses word-translation probabilities that can be obtained from any of a wide variety of word translation models (or word alignment models). The word-translation probabilities can be used to set the initial phrase translation probability distributions in a non-uniform way.

Similarly, the possible phrase translation pairs selected at step 300 in FIG. 4 can be done in a variety of different ways as well. One way is described above with respect to phrase pair extractor 106 shown in FIG. 1. However, if the initial phrase translation probability distributions are not simply set as uniform probability distributions, but instead are set to some reasonable approximation (as discussed above), then phrase pair extractor 106 need not place any initial restrictions on what phrase pairs are considered. Instead, the phrase pairs with a relatively low phrase translation probabilities are simply pruned as processing continues. Setting the initial phrase translation probabilities to be uniform is indicated by block 304 in FIG. 4 and setting them to be non-uniform is indicated by block 306

For each instance of a pair of phrases identified as a possible phrase translation pair, the probability of that pair of phrases being aligned is estimated. This is indicated by block 310 in FIG. 4. (How alignment probabilities are estimated is explained below with respect to FIG. 5.) For each possible phrase translation pair, the alignment probabilities of all instances of the phrase pair are summed to give the expected phrase alignment count for that pair. This is indicated by block 312 in FIG. 4.

Once the expected phrase alignment counts have been computed, component 108 re-estimates the phrase translation probabilities according the expected phrase alignment counts just computed. Re-estimating the phrase translation probabilities is indicated by block 314 in FIG. 4. Re-estimation -of phrase translation probabilities is performed by dividing the expected phrase alignment count for a pair of phrases by the total number of instances of the source or target phrase in the corpus (regardless of whether they participate in possible phrase pairs). That is, if the phrase alignment model predicts a number x expected alignments of source phrase "an" to target phrase "b" in the corpus, and there are y occurrences of "a" and z occurrences of "b" in the corpus, then the probability of an instance of "a" being translated as "b" can be estimated as x/y and the probability of an instance of "b" being translated as "a" can be estimated as x/z. This is expressed mathematically as follows:

$$p_t(b \mid a) = \frac{E(a, b)}{C(a)}, \ p_t(a \mid b) = \frac{E(a, b)}{C(b)}, \qquad \text{Eq. 2}$$

where E denotes expected counts and C denotes observed counts.

The use of the total observed counts of particular source and target phrases (instead of marginalized expected joint counts) in estimating the conditional phrase translation probabilities causes the conditional phrase translation probability distributions for a given word sequence to generally sum to less than 1.0. In one embodiment, the missing probability mass is interpreted as the probability that a given word sequence does not translate as any contiguous word sequence in the other language. Therefore, this addresses some difficulties with prior systems in which phrase translation probability estimates do not properly take account of word sequences that have no phrase alignment consistent with the word alignment.

Estimation component 108 iterates over steps 310-314 (estimating alignment probabilities and computing the expected phrase alignment counts, and then re-estimating the phrase translation probabilities) until one or more desired stopping criteria are met. This is indicated by block 316 in FIG. 4.

The desired stopping criteria can be any desired criteria. For instance, it may be that estimation component 108 simply performs a fixed number of iterations. The fixed number can be empirically determined or determined otherwise. This is indicated by block 318 in FIG. 4. It may also be, however, that the iterations continue until a measurement of model quality stops improving by a desired amount. For instance, it may be that the model training iteratively continues until it no longer decreases the conditional entropy of the phrase translation model as estimated on a held-out sample of source text. Of course, other measurements of model quality, and indeed other stopping criteria, could be used as well. The measured model quality criteria is indicated by block 320 in FIG. 4. Component 108 eventually outputs the final phrase translation table 112 for use in statistical machine translation system 116. Outputting the phase translation table is indicated by block 322 in FIG. 4, and deploying that table in a machine translation system is indicated by block 324 in FIG. 4. It may be that table 112 contains phrase pairs that have corresponding phrase translation probabilities that meet a threshold, or alternatively no threshold is used.

Figure 5:
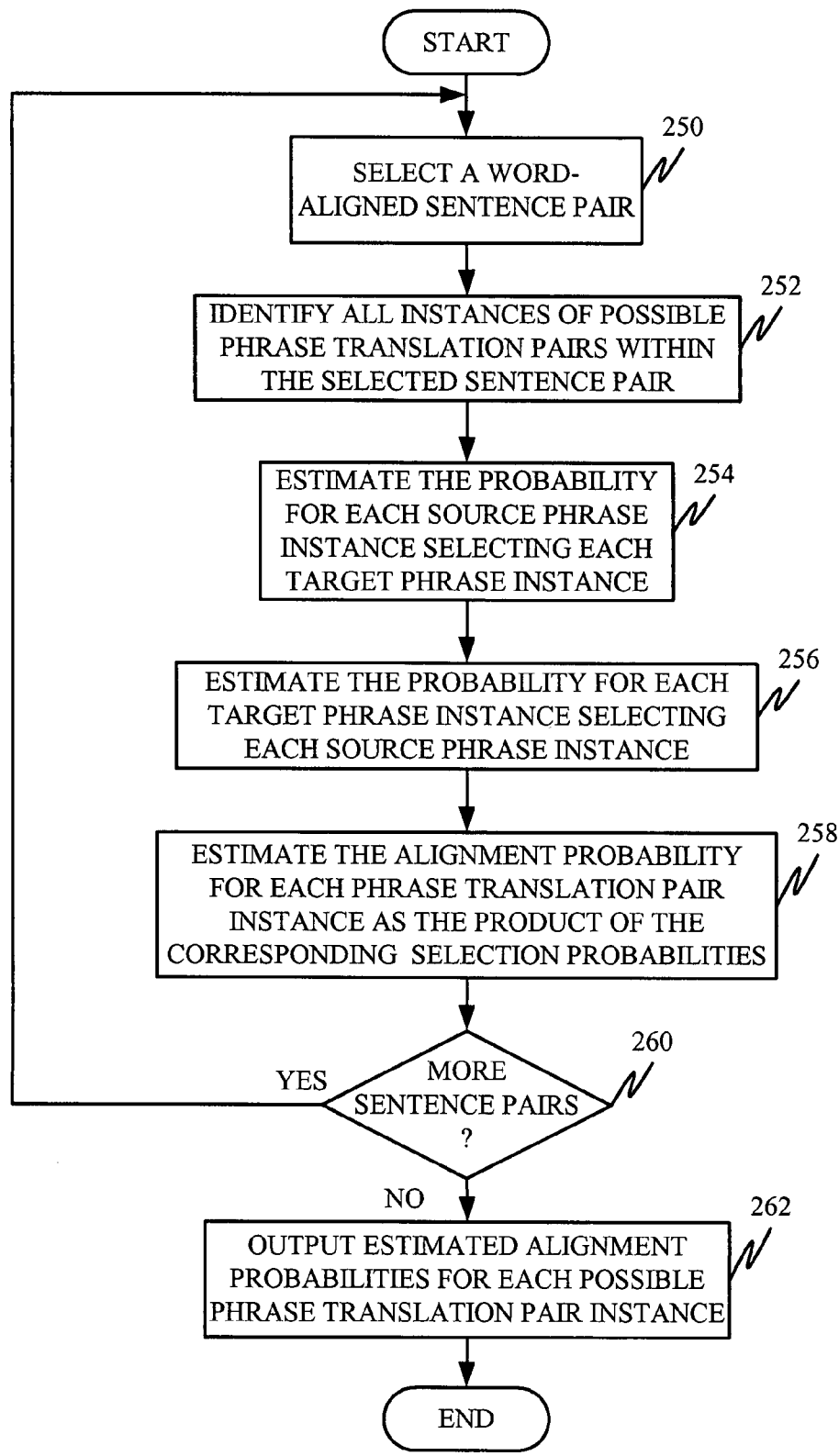
FIG. 5 is a flow diagram illustrating one embodiment of estimating phrase alignment probabilities.

The details of how phrase alignment probabilities are estimated (as indicated in block 310 in FIG. 4) are illustrated in FIG. 5. Phrase alignment is modeled as a stochastic process that combines two subprocesses of selection. Each possible source phrase instance can be viewed as independently selecting a possible target phrase instance, and each possible target phrase instance can be viewed as independently selecting a possible source phrase instance. A source phrase instance and a target phrase instance combine to form an aligned phrase pair instance, if and only if each selects the other. It will thus be seen that the probability of a source phrase instance and a target phrase instance forming an aligned translation pair instance can be estimated as the product of the estimated probabilities of each selecting the other, since it is stipulated that each selection is independent.

It will be seen that the model just described does not assume a segmentation of the source text into nonoverlapping segments, as prior art iteratively trained models have done. Instead, it makes only the weaker assumption that each specific phrase instance selects only one other phrase instance, and thus can align to at most one other phrase instance. Thus, nothing in the present method of estimating alignment probabilities prevents alignment probabilities from summing to more than 1.0 for phrase instances that are not identical, even if they overlap.

For example, if an English sentence in training corpus of sentence translation pairs contains the phrase "the government" and the corresponding French sentence contains the phrase "le gouvernement", there is nothing in the present method of estimating alignment probabilities that would prevent the possible phrase translation pair instances "le gouvernement/the government" and "gouvernement/government" from both having estimated alignment probabilities close to 1.0, so that their sum would be close to 2.0.

With prior art iterative methods that have assumed a unique segmentation into phrases, the alignment probabilities for these two possible phrase translation pair instances would have to sum to 1.0 or less, because the models these methods are based on do not allow two overlapping phrases to both participate in phrase alignments. Both possible phrase translation pair instances could have some non-zero alignment probability, due to uncertainty about what the segmentation is; however, the total alignment probability for overlapping phrases with prior art iterative methods must always sum to 1.0 or less, because the models these methods are based on assume that possible alignments for each of two overlapping phrases cannot both be correct.

To begin the process of estimating phrase alignment probabilities, a word-aligned sentence pair is selected from a training corpus. This is indicated by block 250 in FIG. 5. Then, all instances of possible phrase translation pairs within the sentence pair are identified. (It will be recalled that the possible phrase translation pairs were previously selected as indicated by block 300 in FIG. 4.) This is indicated by block 252 in FIG. 5.

Then, the probabilities for each source phrase instance selecting each possible target phrase instance are estimated, as indicated by block 254 in FIG. 5, and for each possible target phrase instance selecting each source phrase instance, indicated by block 256 in FIG. 5, restricted to those permitted by the set of possible translation pairs.

The estimated probability of a phrase instance y selecting a phrase instance x is proportional to the probability of x translating as y according to the previous translation probability estimates, normalized over the possible non-null choices for x presented by the word-aligned sentence pair.

This can be expressed symbolically as follows:

$$p_s(x \mid y) = \frac{p_t(y \mid x)}{\sum_{x'} P_t(y \mid x')} \quad \text{Eq. 3}$$

where $p_s$ denotes selection probability, $P_t$ denotes translation probability, and x' ranges over the phrase instances within the sentence pair that could possibly align to the phrase instance y according to the set of possible phrase translation pairs.

After estimating the selection probabilities in each direction for a possible phrase pair instance within the aligned sentence pair, the alignment probability is estimated as the product of the selection probabilities. This is indicated by block 258 in FIG. 5.

After estimating all alignment probabilities for the selected sentence pair, it is determined whether any more sentence pairs remain to be processed. If so, the alignment probability estimation procedure is repeated until no more sentence pairs remain to be processed. This is indicated by block 260 in FIG. 5. The estimated alignment probabilities for each possible phrase translation pair instance are output as indicated by block 262 in FIG. 5.

Figure 6:
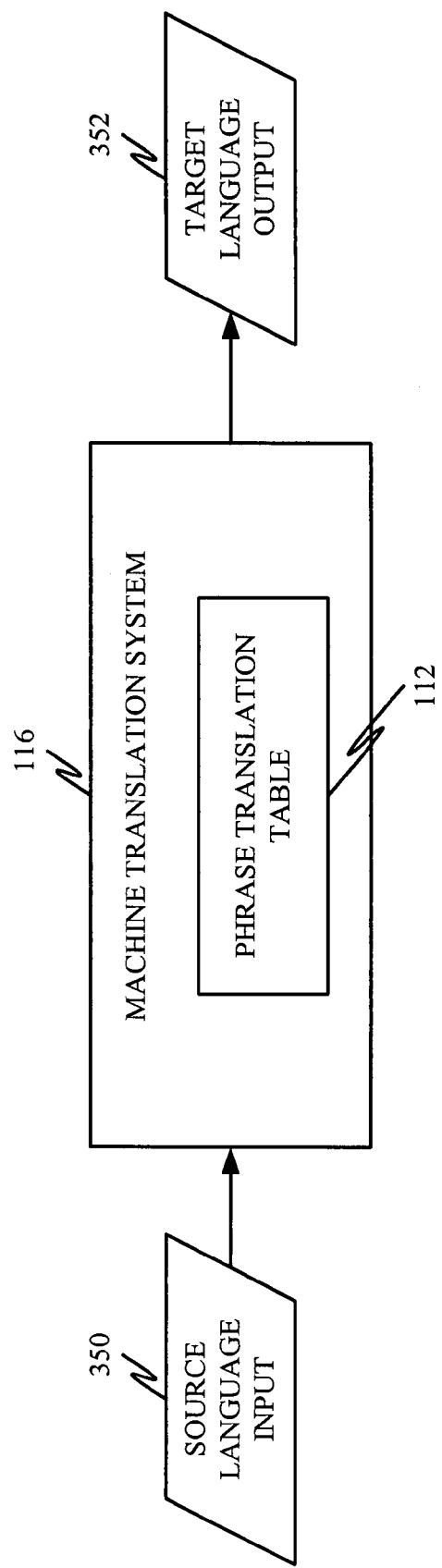
FIG. 6 is a block diagram illustrating a statistical phrase translation model deployed in a machine translation system.

FIG. 6 is a block diagram showing phrase translation table 112 in use in a statistical machine translation system 116. FIG. 6 shows that system 116 receives a source language input 350 and translates it into a target language output 352. Of course, the input 350 can be one or more words, phrases, sentences, etc. as can be target language output 352. In translating input 350 into output 352, machine translation system 116 illustratively employs phrase translation table 112.

Figure 7:
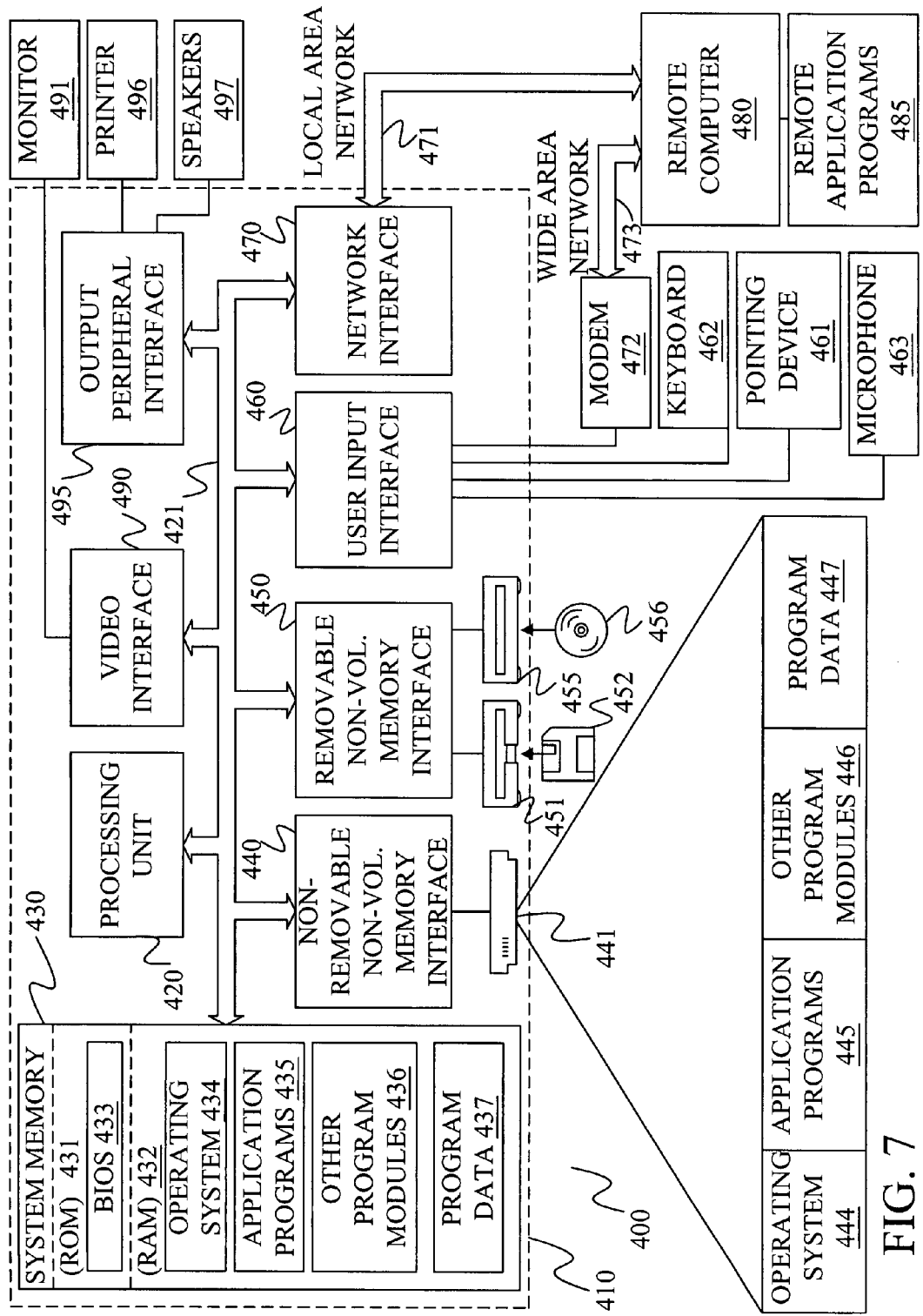
FIG. 7 is a block diagram of one illustrative computing environment.

FIG. 7 is a block diagram of one illustrative computing environment 400 in which training system 100 or the runtime system shown in FIG. 6, can be used. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 7 illustrates operating system 434, application programs 435, other program modules 436, and program data 437. System 100 or the runtime system shown in FIG. 6 can reside at any desired location, such as in modules 436 or elsewhere.

The computer 410 may also include other removable/non-removable volatile/nonvolatile computer storage media. By way of example only, FIG. 7 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 7, provide storage of computer readable instructions, data structures, program modules and other data for the computer 410. In FIG. 6, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 7 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 7 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of estimating phrase translation probabilities for use in a machine translation system, the method being implemented on a computer with a processor, the method comprising:

selecting, with a processor, an instance of a possible phrase translation pair, from a set of possible phrase translation pair instances occurring in a sentence translation pair in a corpus of sentence translation pairs stored on a data store, the possible phrase translation pair instance having an instance of a first phrase in a first language and an instance of a second phrase in a second language, the first and second phrases being possible translations of one another;

estimating, with the processor, an alignment probability that the first phrase instance and the second phrase instance are aligned to each other in the sentence translation pair, not excluding the possibility that another phrase instance in the first language, overlapping the first phrase instance in the first language, and another phrase instance in the second language are also aligned to each other in the sentence translation pair wherein estimating an alignment probability comprises:

generating a first selection probability indicative of how likely the second phrase instance will be selected as a translation of the first phrase instance given the set of instances of possible phrase translation pairs occurring in the given sentence translation pair;

generating a second selection probability indicative of how likely the first phrase instance will be selected as a translation of the second phrase instance given the set of instances of possible phrase translation pairs; and estimating the alignment probability for the selected possible phrase translation pair instance, based on the first and second selection probabilities;

estimating, with the processor, a phrase translation probability for the selected possible phrase translation pair, over the corpus of sentence translation pairs, based on the sum of the alignment probabilities for all instances of the possible phrase translation pair in the corpus of sentence translation pairs;

iterating, with the processor, over selecting possible phrase translation pair instances, estimating alignment probabilities, and estimating phrase translation probabilities until a desired stopping criteria is met.

2. The method of claim 1 wherein iterating comprises:
iterating over the steps of generating a first selection probability, generating a second selection probability and estimating an alignment probability until the desired stopping criterion is reached.

3. The method of claim 1 wherein generating a first selection probability comprises:
generating the first selection probability based on a phrase translation probability indicative of a probability that the first phrase is translated as the second phrase.

4. The method of claim 3 wherein generating a first selection probability comprises:
normalizing the selection probability over all non-null choices for the second phrase instance in the set of possible phrase translation pairs involving the first phrase instance in the given sentence pair.

5. The method of claim 4 and further comprising:
prior to generating a first selection probability and prior to generating a second selection probability, setting phrase translation probabilities, for all phrase pairs in the set of possible phrase translation pairs, to an initial value.

6. The method of claim 5 wherein setting the phrase translation probabilities to an initial value comprises:
setting the phrase translation probabilities according to a uniform probability distribution.

7. The method of claim 5 wherein setting the phrase translation probabilities to an initial value comprises:
setting the phrase translation probabilities according to a non-uniform probability distribution.

8. The method of claim 1 and further comprising:
after iterating, outputting the selected possible phrase translation pair, with the phrase translation probability, to a phrase translation table for use in the machine translation system.

9. The method of claim 1 wherein iterating comprises:
iterating for a predetermined number of iterations.

10. The method of claim 1 wherein iterating comprises:
iterating until a measurement of a translation quality produced by the phrase translation probabilities reaches a desired level.

11. The method of claim 1 and further comprising:
prior to selecting a possible phrase translation pair, extracting the set of possible phrase translation pairs from a word alignment of the corpus of sentence translation pairs.

12. The method of claim 1 and further comprising:
selecting a possible phrase translation pair instance, estimating an alignment probability, estimating a phrase translation probability, and iterating, for each of the set of possible phrase translation pairs.

13. A phrase translation model training system, comprising:

a phrase pair extractor extracting a set of possible phrase pairs from a corpus of sentence translation pairs, each possible phrase pair including a multi-word phrase in a first language and a phrase in a second language;

a feature value estimation component set phrase translation probabilities for each possible phrase pair in the set to an initial value, selecting an instance of a possible phrase translation pair from a sentence translation pair in the corpus, estimating an alignment probability for the possible phrase translation pair instance, the alignment probability being estimated for the possible phrase translation pair instance by assuming that the multi-word phrase in the selected instance has only the phrase instance in the second language as its translation, and assuming that phrase pairs can overlap in each sentence translation pair, estimating a new phrase translation probability for the possible phrase translation pair based on the alignment probability, and iterating over estimating alignment probabilities and translation probabilities until a stopping criterion is met; and a computer processor, being a functional component of the system, activated by the phrase pair extractor and the feature value estimation component, to facilitate extracting, estimating an alignment probability, and iterating.

14. The phrase translation model training system of claim 13 wherein the feature value estimation component is configured to estimate the new phrase translation probability by:
   computing a sum of the alignment probabilities of all the instances of the phrase translation pair selected from the corpus, and re-estimating the phrase translation probability based on the sum.

15. The phrase translation model training system of claim 14 and further comprising:
   a word alignment component configured to word-align sentences in a parallel, bi-lingual training corpus of sentence translation pairs.

16. The phrase translation model training system of claim 14 wherein the feature value estimation component is configured to output the possible phrase pair and the re-estimated translation probability to a phrase translation table used in a statistical machine translation system.

17. A computer-implemented method of training a phrase alignment model implemented on a computer with a processor, comprising:
   initializing, with the processor, phrase translation probability values for a set of phrase pairs extracted from a corpus of sentence translation pairs, to an initial value;
   computing, with the processor an expected phrase alignment count indicative of an expected number of times a selected phrase pair is aligned in the corpus, by computing a first selection probability indicative of how likely a second phrase in the phrase pair will be selected as a translation of a first phrase in the phrase pair given the set of phrase pairs occurring in a given sentence translation pair in the corpus, and computing a second selection probability indicative of how likely the first phrase will be selected as a translation of the second phrase in the phrase pair, given the set of phrase pairs occurring in the given sentence translation pair in the corpus, and given a current value of the phrase translation probabilities;
   re-estimating, with the processor, the phrase translation probability values based on the expected phrase alignment count computed;
   iterating, with the processor, over the steps of computing an expected phrase alignment count and re-estimating the phrase translation probability values until a desired stopping criteria is met; and
   after iterating, outputting, with the processor, the selected phrase pair and the phrase translation probability values for the selected phrase pair, to a phrase translation table for use in a machine translation system.

18. The computer-implemented method of claim 17 wherein initializing phrase translation probability values comprises:
   setting the phrase translation probability values to a non-uniform probability distribution based on estimated word translation probability values.

* * * * *